(12) United States Patent
Shih et al.

(10) Patent No.: US 8,893,353 B2
(45) Date of Patent: Nov. 25, 2014

(54) OPENING/CLOSING APPARATUS AND HINGE DEVICE THEREOF

(71) Applicant: Wistron Corporation, New Taipei (TW)

(72) Inventors: Shih-Kuan Shih, New Taipei (TW); Yung-Shun Ma, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 13/887,685

(22) Filed: May 6, 2013

(65) Prior Publication Data

US 2014/0007380 A1    Jan. 9, 2014

(30) Foreign Application Priority Data

Jul. 5, 2012 (TW) .............................. 101124275 A

(51) Int. Cl.
*E05D 11/10* (2006.01)
*G06F 1/16* (2006.01)

(52) U.S. Cl.
CPC ............ *G06F 1/1681* (2013.01); *G06F 1/1616* (2013.01)
USPC ........................... 16/330; 16/303; 361/679.27

(58) Field of Classification Search
USPC .................. 16/303, 330, 334, 337, 341, 342; 361/679.27; 248/920–923; 379/433.13; 455/575.3
See application file for complete search history.

(56) References Cited

U.S. PATENT DOCUMENTS

| | | | |
|---|---|---|---|
| 6,862,779 B1 * | 3/2005 | Lu et al. ........................... | 16/340 |
| 7,222,396 B2 * | 5/2007 | Lu et al. ........................... | 16/340 |
| 7,430,786 B1 * | 10/2008 | Jian .................................. | 16/330 |
| 7,506,408 B2 * | 3/2009 | Lu et al. ........................... | 16/340 |
| 7,520,026 B1 * | 4/2009 | Lin .................................. | 16/337 |
| 7,533,446 B1 * | 5/2009 | Lin .................................. | 16/330 |
| 7,536,749 B2 * | 5/2009 | Lu et al. ........................... | 16/330 |
| 7,631,398 B1 | 12/2009 | Lin | |
| 8,245,354 B2 * | 8/2012 | Duan et al. ....................... | 16/303 |
| 8,302,260 B2 * | 11/2012 | Chen et al. ....................... | 16/330 |
| 8,634,548 B2 * | 1/2014 | Jung et al. ................ | 379/433.13 |

\* cited by examiner

*Primary Examiner* — William Miller
(74) *Attorney, Agent, or Firm* — Muncy, Geissler, Olds & Lowe, P.C.

(57) ABSTRACT

A hinge device includes a first main body and a second main body relative to the first main body. The first main body includes a raised structure. The second main body includes a first position structure, a first torsion control structure, a second position structure, and a second torsion control structure, and the first position structure and the second position structure correspond to the raised structure respectively. The first torsion control structure includes a first outer control portion and a first inner control portion. The second torsion control structure includes a second outer control portion and a second inner control portion. A height of the first inner control portion is different from a height of the second inner control portion, and a height of the first outer control portion is different from a height of the second outer control portion.

20 Claims, 18 Drawing Sheets

OPENING/CLOSING APPARATUS AND HINGE DEVICE THEREOF

BACKGROUND OF THE INVENTION

1. Field of the Invention

The present invention relates to a hinge device, and more particularly, to a hinge device applied in an opening/closing apparatus, wherein the hinge device can change the magnitude of torque in accordance with the angle of rotation.

2. Description of the Related Art

An electronic product such as a notebook computer is one of the appliances commonly used by people in modern life. The basic components of a notebook computer are a main body and a display screen connected pivotally to the main body. When a user wants to use the notebook computer, he or she needs to flip the display screen with respect to the main body to an angle suitable for watching and operating. Generally, the main body and the display screen are pivotally connected through a hinge component such as hinges. In order to avoid rotating the display screen too fast or forming a flip angle which is too large, the hinge component must be designed to provide torque generated by rotation to improve the incidence of the aforementioned shortcomings.

In recent years, with fast development of the touch technology, some notebook computers support touch operation function to provide different operation experience to the user. Nevertheless, the torque provided by the original designed hinge component is limited; when the user applies force to the display screen to input touch instruction frequently, the display screen may not be held at a fixed position steadily due to the large force from the user, and the display screen may even continue to rotate downward to the rear side of the notebook computer, so as to easily cause troubles for the user in operating and watching.

SUMMARY OF THE INVENTION

A main object of the present invention is to provide a hinge device applied in an electronic apparatus, wherein the hinge device can change the magnitude of torque in accordance with the angle of rotation.

In order to achieve the abovementioned object, a hinge device of the present invention includes a first main body and a second main body. The first main body includes a first shaft hole and a first surface, and the first surface surrounds the first shaft hole to form a first inner ring and a first outer ring. The first surface includes a raised structure, wherein the raised structure includes a first raised portion on the first outer ring and a second raised portion on the first inner ring, and the second raised portion is disposed relative to the first raised portion.

The second main body includes a second shaft hole and a second surface corresponding to the first surface, and the second surface surrounds the second shaft hole to form a second inner ring and a second outer ring. The second surface includes a first position structure, a first torsion control structure, a second position structure, and a second torsion control structure. The first torsion control structure is adjacent to the first position structure and the second position structure, and the second torsion control structure is adjacent to the first position structure and the second position structure; the second torsion control structure is disposed relative to the first torsion control structure, and the second shaft hole is between the first torsion control structure and the second torsion control structure. The first position structure and the second position structure correspond to the raised structure respectively.

The first torsion control structure includes a first outer control portion on the second outer ring and a first inner control portion on the second inner ring. The second torsion control structure includes a second outer control portion on the second outer ring and a second inner control portion on the second inner ring. Wherein a height of the first inner control portion is different from a height of the second inner control portion, and a height of the first outer control portion is different from a height of the second outer control portion.

In one embodiment of the present invention, the height of the first inner control portion is lower than the height of the second inner control portion, and the height of the first outer control portion is higher than the height of the second outer control portion.

In another embodiment of the present invention, the first raised portion and the second raised portion have the same height, the first inner control portion and the second outer control portion have the same height, and the second inner control portion and the first outer control portion have the same height.

In another embodiment of the present invention, the first position structure includes a first recessed portion and a second recessed portion, wherein the first recessed portion is disposed on the second outer ring and relative to the first raised portion, and the second recessed portion is disposed on the second inner ring and relative to the second raised portion. The second position structure includes a third recessed portion and a forth recessed portion, wherein the third recessed portion is disposed on the second outer ring and relative to the first raised portion, and the forth recessed portion is disposed on the second inner ring and relative to the second raised portion.

In another embodiment of the present invention, the raised structure further includes a third raised portion on the first outer ring and the third raised portion is adjacent to the first raised portion The first position structure further includes a fifth recessed portion on the second outer ring to and the fifth recessed portion is adjacent to the first recessed portion. The second position structure further includes a sixth recessed portion on the second outer ring and the sixth recessed portion is adjacent to the third recessed portion. A height of the third raised portion is lower than a height of the first raised portion, and a height of the third raised portion is lower than a height of the second raised portion.

The hinge device of the present invention is designed by means of the corresponding structure of the first main body and the second main body. According to the height difference of each structure of the second main body, when the first main body rotates relative to the second main body between the first position structure and the second position structure, or rotates until behind the second position structure, the second main body contacts with the first main body by the different areas of the first torsion control structure and the second torsion control structure respectively. Therefore, the hinge device of the present invention forms different contact areas resulting from different rotation positions, and providing different magnitude of torque in coordination with the elastic component of the hinge device.

DETAILED DESCRIPTION OF THE PREFERRED EMBODIMENT

The technical content of the invention will become more apparent from the following detailed description of several preferred embodiments.

Figure 1:
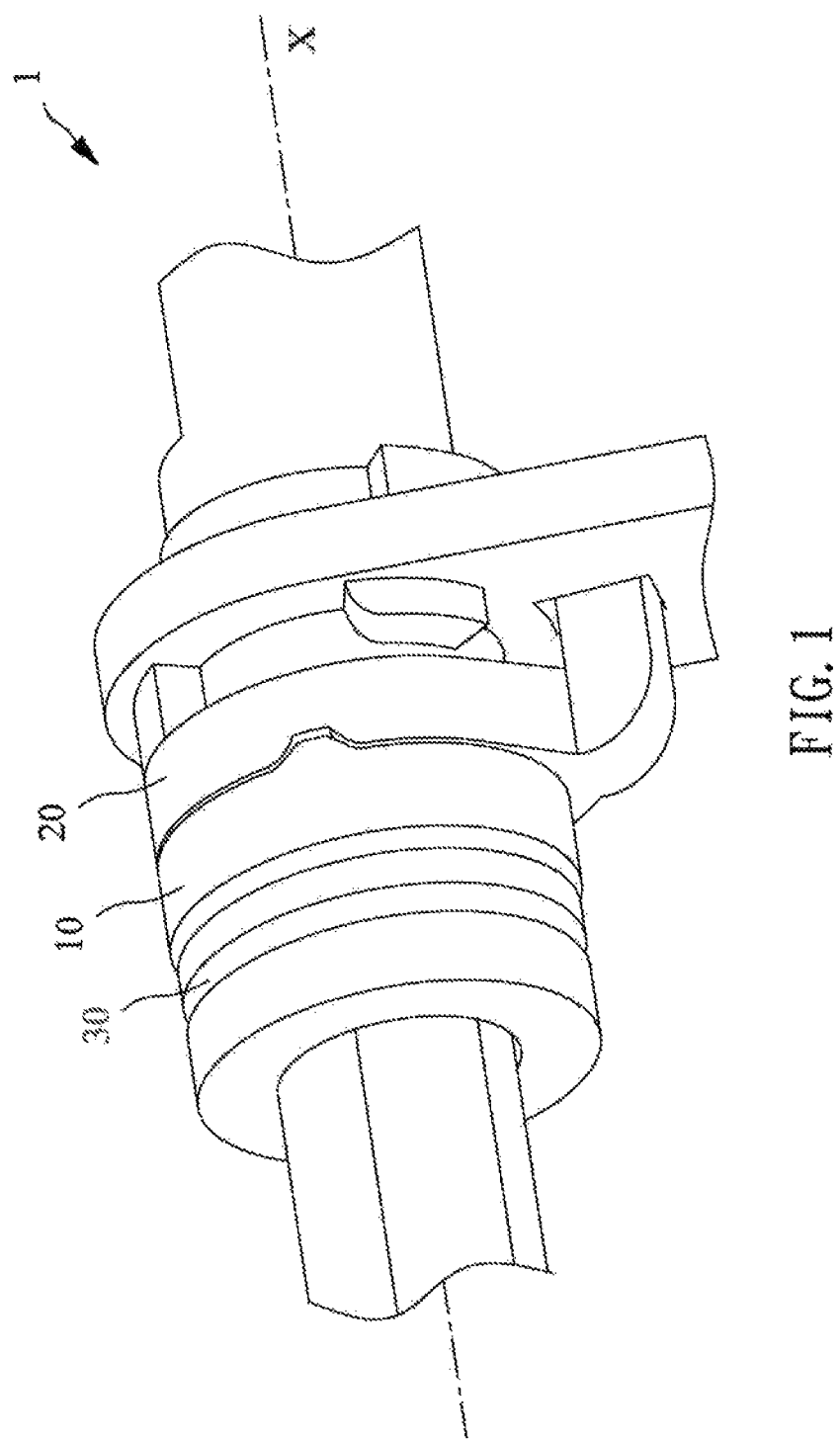
FIG. 1 is a diagram illustrating a hinge device of the present invention.

Please refer to FIG. 1, which is a diagram illustrating a hinge device 1 of the present invention. As shown in FIG. 1, a hinge device 1 of the present invention is applied for connecting pivotally two components of an electronic apparatus, such that one component can rotate relative to another component. In one embodiment of the present invention, the electronic apparatus is notebook computer, wherein the components are a computer main body base and an upper cover with display screen respectively, but the components are not limited to this. The electronic apparatus also can be other similar apparatus with a clamshell structure, such as cell phones, multimedia players, etc.

The hinge device 1 of the present invention including a first main body 10, a second main body 20 and an elastic component 30 to together form a coaxial structure. The first main body 10 is combined correspondingly with the second main body 20 and is able to rotate along an axis X. The elastic component 30 abuts upon another side of the first main body 10. When the elastic component 30 is compressed, an elasticity force is generated by the displacement of the elastic component 30 to determine the magnitude of torque between the first main body 10 and the second main body 20.

Figure 2:
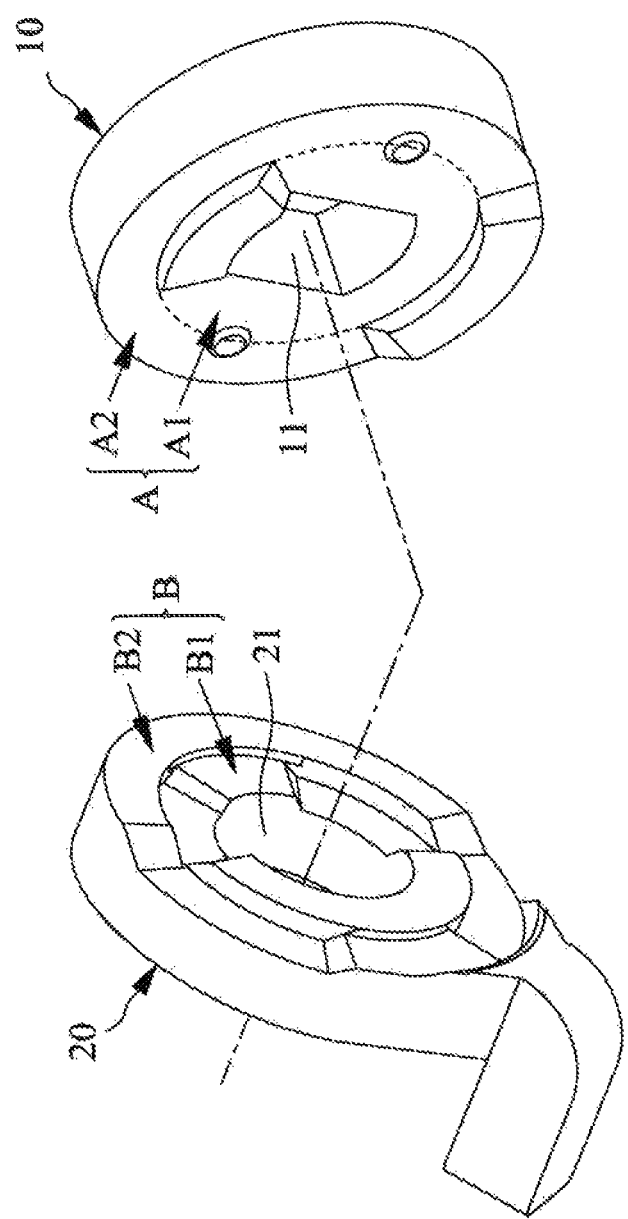
FIG. 2 is a diagram illustrating the first main body and the second main body of the hinge device of the present invention.

Please refer to FIG. 2, which is a diagram illustrating the first main body 10 and the second main body 20 of the hinge device 1 of the present invention. As shown in FIG. 2, the first main body 10 of the hinge device 1 of the present invention includes a first shaft hole 11 and a first surface A. The first shaft hole 11 is located at an essentially central position of the first main body 10, and the first surface A surrounds the first shaft hole 11 to form a first inner ring A1 and a first outer ring A2 adjacent to the first inner ring A1. The first outer ring A2 is disposed on the outer side of the first inner ring A1.

The second main body 20 includes a second shaft hole 21 and a second surface B corresponding to the first surface A. The second surface B directly contacts the first surface A of the first main body 10 to produce positioning or friction effect between each other. The second shaft hole 21 is located at an essentially central position of the second main body 20, and the second surface B surrounds the second shaft hole 21 to form a second inner ring B1 and a second outer ring B2 adjacent to the second inner ring B1. The second outer ring B2 is disposed on the outer side of the second inner ring B1.

Figure 3B:
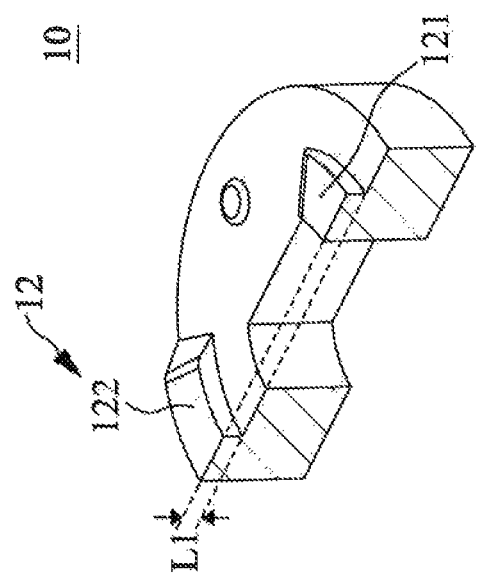
FIG. 3(b) is a sectional view illustrating the first main body of the hinge device of the present invention.
Figure 3A:
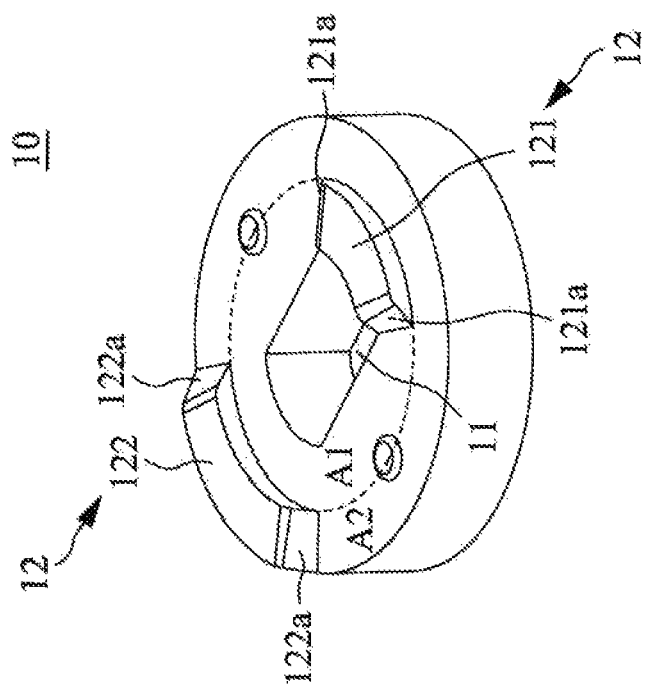
FIG. 3(a) is a structure diagram illustrating the first main body of the hinge device of the present invention.

Please refer to FIG. 3(a) and FIG. 3(b) together. FIG. 3(a) is a structure diagram illustrating the first main body 10 of the hinge device of the present invention; FIG. 3(b) is a sectional view illustrating the first main body 10 of the hinge device of the present invention. As shown in FIG. 3(a), the first surface of the first main body 10 includes a raised structure 12. In this embodiment, the raised structure 12 includes a first raised portion 121 and a second raised portion 122. The first raised portion 121 is disposed on the first outer ring A2, and the second raised portion 122 is disposed relative to the first raised portion 121 (relatively disposed based on the first shaft hole 11) and on the first inner ring A1. The first raised portion 121 and the second raised portion 122 both use circular-arc raised structures, and a central angle corresponding to an arc length of the first raised portion 121 is equal to a central angle corresponding to an arc length of the second raised portion 122.

Furthermore, two joints of the first raised portion 121 along its circumference extending direction (namely both ends of the first raised portion 121) and the first surface of the first main body 10 formed two cushion portion 121a, and two joints of the second portion 122 along its circumference extending direction (namely both ends of the second portion 122) and the first surface of the first main body 10 formed two cushion portion 122a. The cushion portion 121a and 122a provide sliding cushion effect when the first main body 10 contacts with the second main body to rotate. The cushion portions 121a and 122a can be incline or curve structures, but the cushion portions are not limited to this.

As shown in FIG. 3(b), the raised structure 12 provides the torque when the hinge device 1 rotates. Due to the first raised portion 121 and the second raised portion 122 directly contact with the second main body to rotate at the same time, in this embodiment, the first raised portion 121 and the second raised portion 122 have the same height L1 (namely the protruding height relative to the first surface of the first main body 10), but is not limited to this embodiment.

Figure 4A:
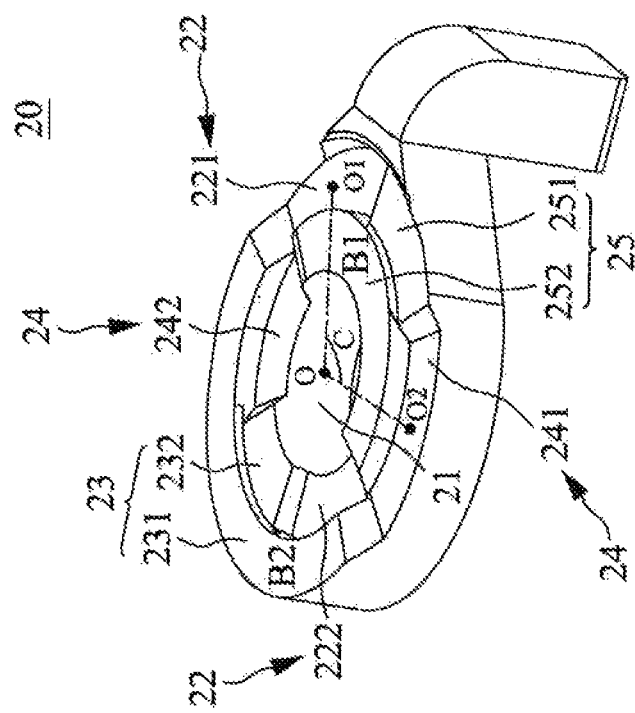
FIG. 4(a) is a structure diagram illustrating the second main body of the hinge device of the present invention.
Figure 4B:
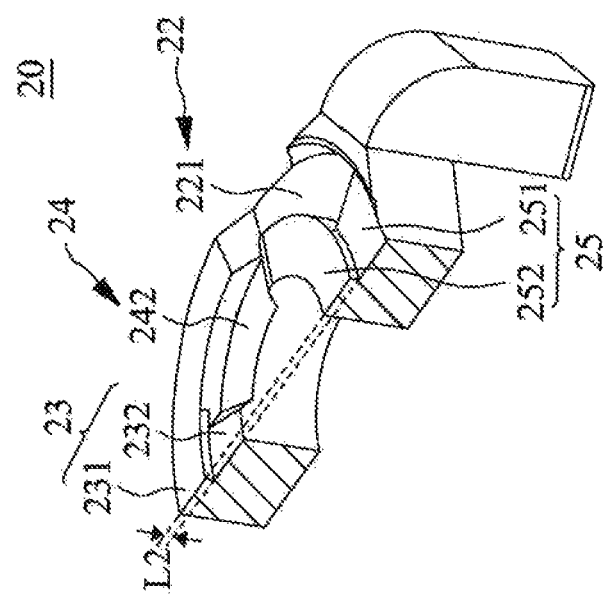
FIG. 4(b) is a sectional view illustrating the second main body of the hinge device of the present invention.

Please refer to FIG. 4(a) and FIG. 4(b) together. FIG. 4(a) is a structure diagram illustrating the second main body 20 of the hinge device of the present invention; FIG. 4(b) is a sectional view illustrating the second main body 20 of the hinge device of the present invention. As shown in FIG. 4(a), the second surface B of the second main body 20 includes a first position structure 22, a first torsion control structure 23, a second position structure 24, and a second torsion control structure 25. The first torsion control structure 23 is adjacent to the first position structure 22 and the second position structure 24, and the second torsion control structure 25 is also adjacent to the first position structure 22 and the second position structure 24. The second torsion control structure 25 is disposed relative to the first torsion control structure 23, and the second shaft hole 21 is between the first torsion control structure 23 and the second torsion control structure 25.

The first position structure 22 and the second position structure 24 are used to provide positioning function during the rotating process of the hinge device. The first position structure 22 and the second position structure 24 correspond to the raised structure of the first main body respectively. The first position structure 22 includes a first recessed portion 221 and a second recessed portion 222, and the second position structure 24 includes a third recessed portion 241 and a forth recessed portion 242. The first recessed portion 221 and the third recessed portion 241 are both disposed on the second outer ring B2 and relative to the first raised portion of the first main body and the second recessed portion 222 and the forth recessed portion 242 are both disposed on the second inner ring B1 and relative to the second raised portion of the first main body. Therefore, the second recessed portion 222 is disposed relative to the first recessed portion 221 based on the second shaft hole 21, and the forth recessed portion 242 is also disposed relative to the third recessed portion 241 based on the second shaft hole 21. In addition, the first recessed portion 221, the second recessed portion 222, the third recessed portion 241, and the forth recessed portion 242 all use circular-arc recessed structures, and central angles corresponding to arc lengths of the first recessed portion 221, the second recessed portion 222, the third recessed portion 241, and the forth recessed portion 242 are the same. The recessed surfaces of the first recessed portion 221, the second recessed portion 222, the third recessed portion 241, and the forth recessed portion 242 are on the same surface to recess the raised structure correspondingly when positioning.

The first recessed portion 221 includes a first center O1, the third recessed portion 241 includes a second center O2, and the second shaft hole 21 includes a shaft hole center O. The shaft hole center O can connect with the first center O1 and the second center O2 respectively to form two connections, and an included angle C formed by the connections of the shaft hole center O with the first center O1 and the second center O2 is equal to a positioning angle of rotation set by the hinge device. In this embodiment, the included angle C is approximately 90 degree to 120 degree; it means that when the hinge device provides a positioning effect at 0 degree by the first position structure 22, it provides another positioning effect to the angle set between 90 degree to 120 degree by the second position structure 24. For illustration, in all embodiments of the present invention, the included angle C is 120 degree as an example, but the present invention is not limited to this.

The first torsion control structure 23 is between the first position structure 22 and the second position structure 24. The first torsion control structure 23 includes a first outer control portion 231 and a first inner control portion 232. The first outer control portion 231 is disposed on the second outer ring B2, and the first inner control portion 232 is disposed on the second inner ring B1; the first outer control portion 231 is adjacent to the first inner control portion 232. The second torsion control structure 25 includes a second outer control portion 251 and a second inner control portion 252. The second outer control portion 251 is disposed on the second outer ring B2, and the second inner control portion 252 is disposed on the second inner ring B1; the second outer control portion 251 is adjacent to the second inner control portion 252.

As shown in FIG. 4(b), the first torsion control structure 23 and the second torsion control structure 25 are used to provide surface contact with different areas when the hinge device 1 rotates, to produce different torques. Therefore, in structural design, the first torsion control structure 23 and the second torsion control structure 25 are both higher than the recessed surfaces of the first position structure 22 and the second position structure 24. A height of the first inner control portion 232 is lower than a height of the second inner control portion 252 (a height difference between the first inner control portion 232 and the second inner control portion 252 is L2), and a height of the first outer control portion 231 is higher than a height of the second outer control portion 251 (a height difference between the first outer control portion 231 and the second outer control portion 251 is also L2). The first inner control portion 232 and the second outer control portion 251 have the same height, and the second inner control portion 252 and the first outer control portion 231 have the same height.

In addition, all joints of any one of the control portions of the first torsion control structure 23 and any one of the recessed portions of the first position structure 22, any one of the control portions of the first torsion control structure 23 and any one of the recessed portions of the second position structure 24, any one of the control portions of the second torsion control structure 25 and any one of the recessed portions of the first position structure 22, and any one of the control portions of the second torsion control structure 25 and any one of the recessed portions of the second position structure 24 form cushion portions to provide cushion effect between the corresponding structure when the second main body rotates relative to and contact with the first main body. The cushion portion can be an incline or curve structure, but the present invention is not limited to this.

Figure 5A:
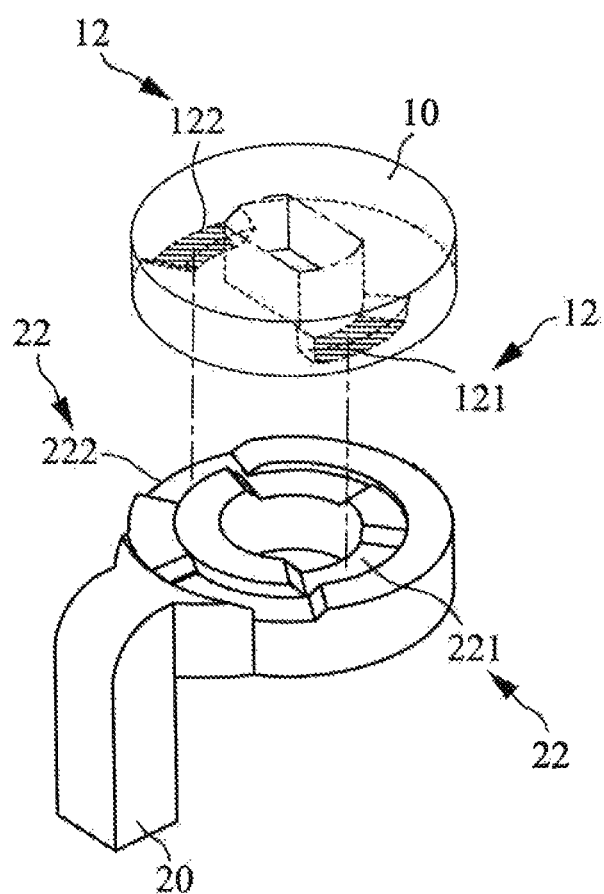
FIG. 5(a) is a structure diagram illustrating the hinge device of the present invention located at 0 degree.
Figure 5B:
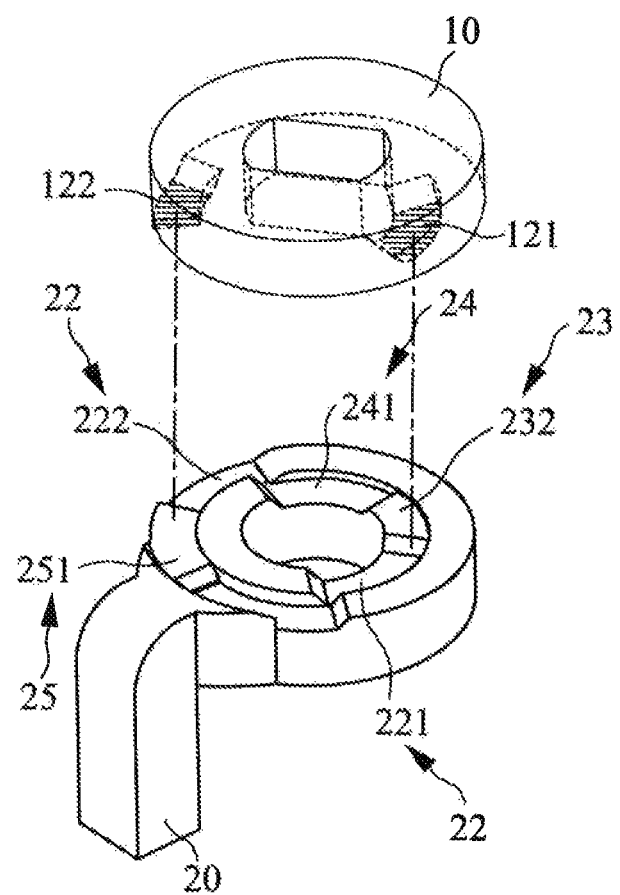
FIG. 5(b) is a structure diagram illustrating the hinge device of the present invention rotated between 0 degree and 120 degree.
Figure 5C:
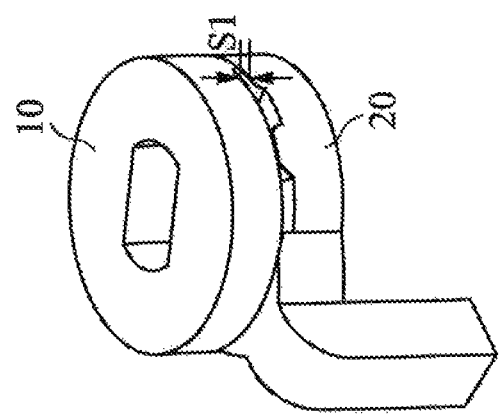
FIG. 5(c) is an exterior diagram illustrating the hinge device of the present invention rotated between 0 degree and 120 degree.

Please refer to FIG. 5(a) to FIG. 5(c) together. FIG. 5(a) is a structure diagram illustrating the hinge device of the present invention located at 0 degree; FIG. 5(b) is a structure diagram illustrating the hinge device of the present invention rotated between 0 degree and 120 degree; FIG. 5(c) is an exterior diagram illustrating the hinge device of the present invention rotated between 0 degree and 120 degree. In order to disclose clearly the operation status between different components of the hinge device 1 of the present invention, the first main body 10 and the second main body 20 are illustrated in the form of separation to each other in FIG. 5(a) and FIG. 5(b), which they are combined to operate originally.

As shown in FIG. 5(a), when the hinge device 1 of the present invention is located at 0 degree (namely the first main body 10 dose not rotate relative to the second main body 20 in an initial status), the raised structure 12 of the first main body 10 (as the dotted line structure shown in FIG. 5(a)) is contained relatively in the first position structure 22 of the second main body 20; it means that the first raised portion 121 is contained relatively in the first recessed portion 221 to keep a surface contact with each other, and the second raised portion 122 is contained relatively in the second recessed portion 222 to keep a surface contact with each other. The contact surface of the structure at this time is as the area of oblique lines shown in FIG. 5(a).

As shown in FIG. 5(b), when the hinge device 1 of the present invention rotates between 0 degree and 120 degree, the first raised portion 121 of the raised structure 12 of the first main body 10 slides out from the first recessed portion 221 and contacts with the first inner control portion 232 of the first torsion control structure 23 of the second main body 20. Simultaneously, the second raised portion 122 of the raised structure 12 also slides out from the second recessed portion 222 and contacts with the second outer control portion 251 of the second torsion control structure 25 (because the first raised portion 121 and the second raised portion 122 have the same height, and the first inner control portion 232 and the second outer control portion 251 have the same height). The areas of surface contact are changed as the area of oblique lines shown in FIG. 5(b).

The heights of the first inner control portion 232 and the second outer control portion 251 are both higher than the recessed surface of the first position structure 22. Therefore, the first main body 10 moves relative to the second main body 20 along the axis when the first main body 10 rotates between 0 degree to 120 degree relative to the second main body 20, such that an interstice S1 is formed between the first main body 10 and the second main body 20, as shown in FIG. 5(c). In the meantime, the elastic component (not shown) disposed on the other side of the first main body 10 provides reverse support force because of being compressed, so as to increase the magnitude of torque between the first main body 10 and the second main body 20. Then, a rotational resistance to the hinge device 1 of the present invention is provided when the first main body 10 rotating relative to the second main body 20 between the first position structure 22 (0 degree) and the second position structure 24 (120 degree).

Figure 6A:
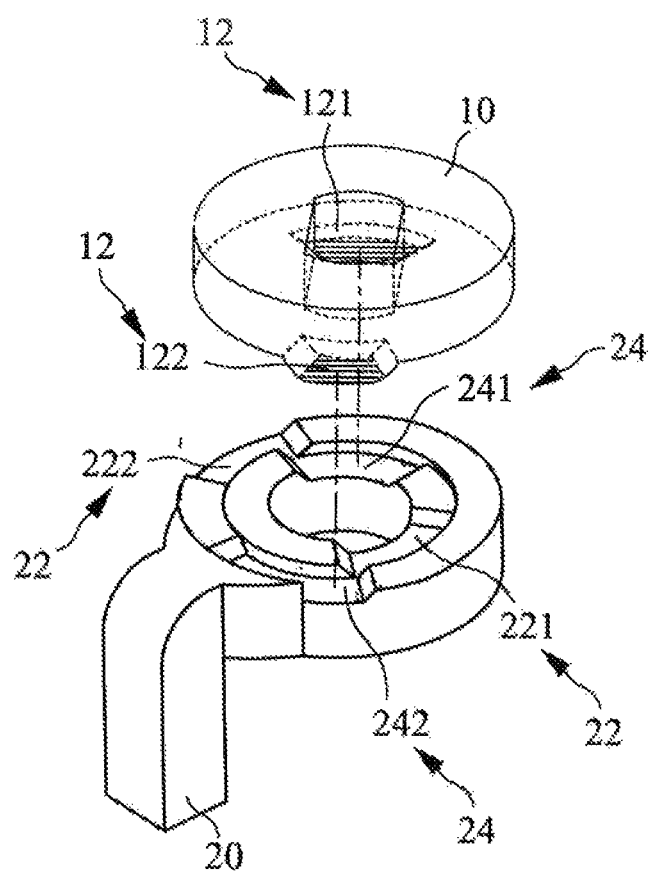
FIG. 6(a) is a structure diagram illustrating the hinge device of the present invention located at 120 degree.
Figure 6B:
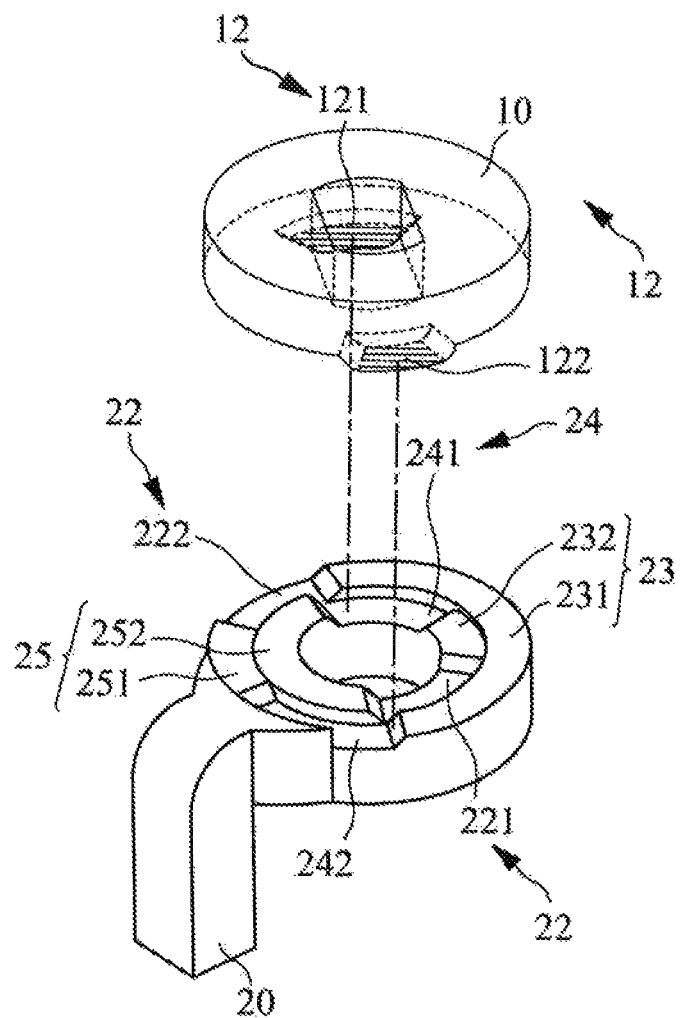
FIG. 6(b) is a structure diagram illustrating the hinge device of the present invention rotated to greater than 120 degree.
Figure 6C:
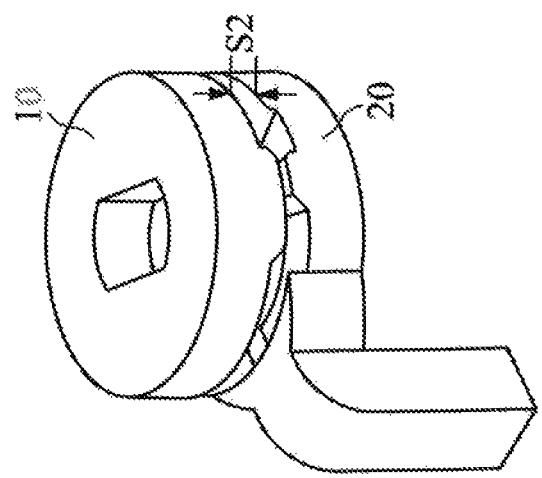
FIG. 6(c) is an exterior diagram illustrating the hinge device of the present invention rotated to greater than 120 degree.

Please refer to FIG. 6(a) to FIG. 6(c) together. FIG. 6(a) is a structure diagram illustrating the hinge device of the present invention located at 120 degree; FIG. 6(b) is a structure diagram illustrating the hinge device of the present invention rotated to greater than 120 degree; FIG. 6(c) is an exterior diagram illustrating the hinge device of the present invention rotated to greater than 120 degree. In order to disclose clearly the operation status between different components of the hinge device 1 of the present invention, the first main body 10 and the second main body 20 are illustrated in the form of separation to each other in FIG. 6(a) and FIG. 6(b), which they are combined to operate originally.

As shown in FIG. 6(a), when the hinge device 1 of the present invention rotates to 120 degree, the raised structure 12 of the first main body 10 is contained relatively in the second position structure 24 of the to second main body 20; it means that the first raised portion 121 is contained relatively in the third recessed portion 241 to keep a surface contact with each other, and the second raised portion 122 is contained relatively in the forth recessed portion 242 to keep a surface contact with each other. The contact surface of the structure at this time is as the area of oblique lines shown in FIG. 6(a).

As shown in FIG. 6(b), when the hinge device 1 of the present invention rotates to greater than 120 degree, the first raised portion 121 of the raised structure 12 of the first main body 10 slides out from the third recessed portion 241 and contacts with the second inner control portion 252 of the second torsion control structure 25 of the second main body 20. Simultaneously, the second raised portion 122 of the raised structure 12 also slides out from the forth recessed portion 242 and contacts with the first outer control portion 231 of the first torsion control structure 23 (because the first raised portion 121 and the second raised portion 122 have the same height, and the first outer control portion 231 and second inner control portion 252 have the same height). The areas of surface contact are changed as the area of oblique lines shown in FIG. 6(b).

The heights of the first outer control portion 231 and the second inner control portion 252 are both higher than the recessed surface of the second position structure 24. Therefore, the first main body 10 also moves relative to the second main body 20 along the axis when the first main body 10 rotates to greater than 120 degree relative to the second main body 20, such that an interstice S2 is formed between the first main body 10 and the second main body 20, as shown in FIG. 6(c). The interstice S2 is larger than the interstice S1 of the aforementioned condition (because that the height of the first inner control portion 232 is lower than the height of the second inner control portion 252, and the height of the first outer control portion 231 is higher than the height of the second outer control portion 251). In the meantime, the elastic component (not shown) disposed on the other side of the body 10 provides reverse support force because of being compressed; the degree of compression of the elastic component is greater than that in the aforementioned status between 0 degree to 120 degree, so as to increase the magnitude of torque more between the first main body 10 and the second main body 20. Accordingly, the hinge device 1 of the present invention provides different rotational resistances in accordance with different operation stages between the first position structure 22 (0 degree) and the second position structure 24 (120 degree), and behind the second position structure 24 (120 degree).

Figure 7A:
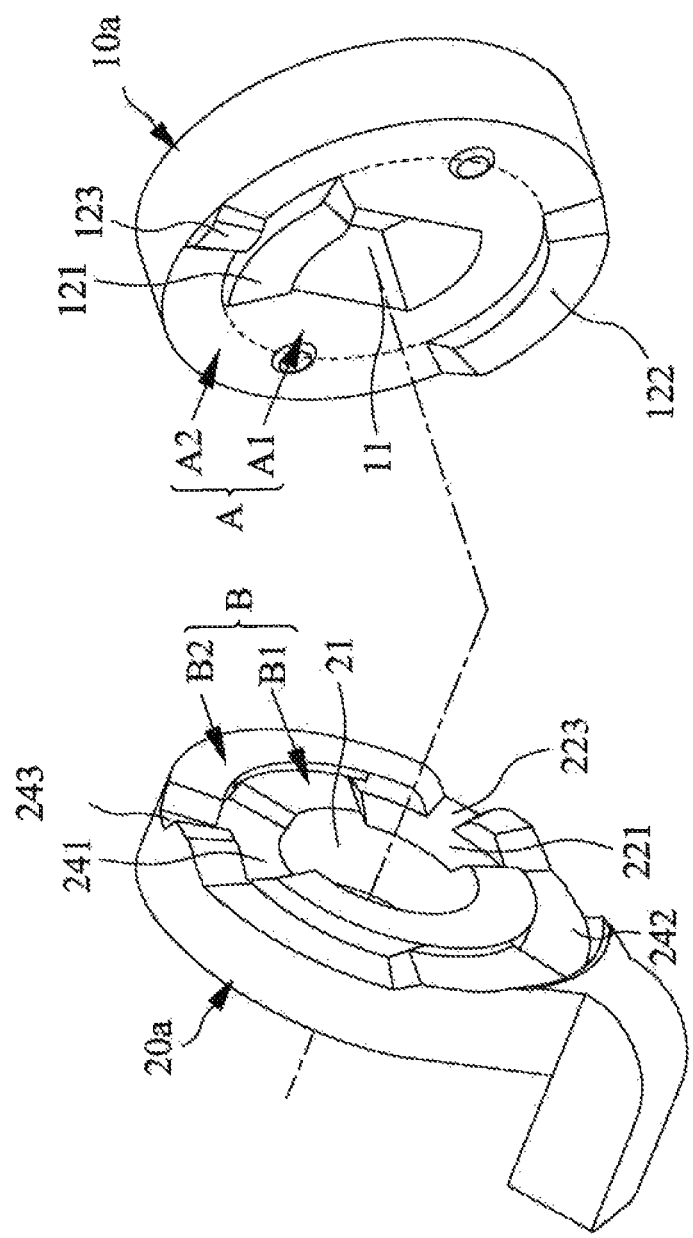
FIG. 7(a) is a diagram illustrating the first main body and the second main body of the hinge device of another embodiment of the present invention.
Figure 7B:
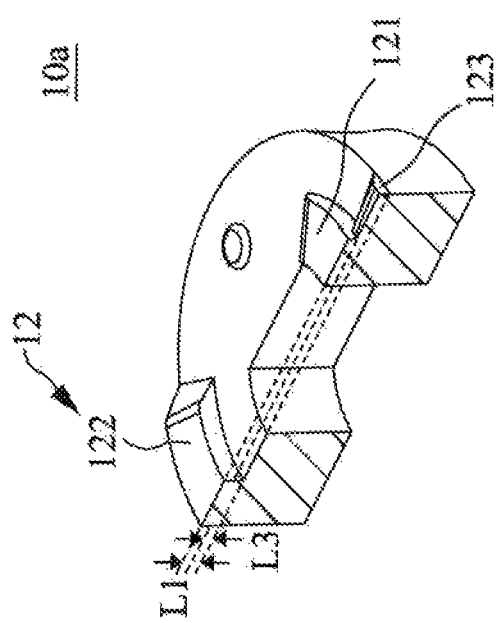
FIG. 7(b) is a sectional view illustrating the first main body of the hinge device of another embodiment of the present invention.

Please refer to FIG. 7(a) and FIG. 7(b) together. FIG. 7(a) is a diagram illustrating the first main body 10a and the second main body 20a of the hinge device of another embodiment of the present invention; FIG. 7(b) is a sectional view illustrating the first main body 10a of the hinge device of another embodiment of the present invention. As shown in FIG. 7(a), in this embodiment, the raised structure 12a of the first main body 10a further includes a third raised portion 123. The third raised portion 123 is disposed on the first outer ring A2 and adjacent to the first raised portion 121, so that a position of the third raised portion 123 is symmetrical to the second raised portion 122. The first raised portion 121 and the third raised portion 123 together form an approximate T-shape structure, but the present invention is not limited to this.

The first position structure 22a of the second main body 20a further includes a fifth recessed portion 223, and the second position structure 24a further includes a sixth recessed portion 243. The fifth recessed portion 223 and the sixth recessed portion 243 provide to relatively contain the third raised portion 123. The fifth recessed portion 223 is disposed on the second outer ring B2 and adjacent to the first recessed portion 221, and the sixth recessed portion 243 is also disposed on the second outer ring B2 and adjacent to the third recessed portion 241. A position of the fifth recessed portion 223 is symmetrical to the second recessed portion 222, and a position of the sixth recessed portion 243 is symmetrical to the forth recessed portion 242.

As shown in FIG. 7(b), in this embodiment, a height L3 of the third raised portion 123 of the first main body 10a is lower than the height L1 of the first raised portion 121, and the height L3 of the third raised portion 123 is also lower than the height L1 of the second raised portion 122. When the first main body 10a rotates relative to the second main body, more contact areas with the first torsion control structure 23 are provided by the third raised portion 123 to adjust the magnitude of produced torque.

Figure 8A:
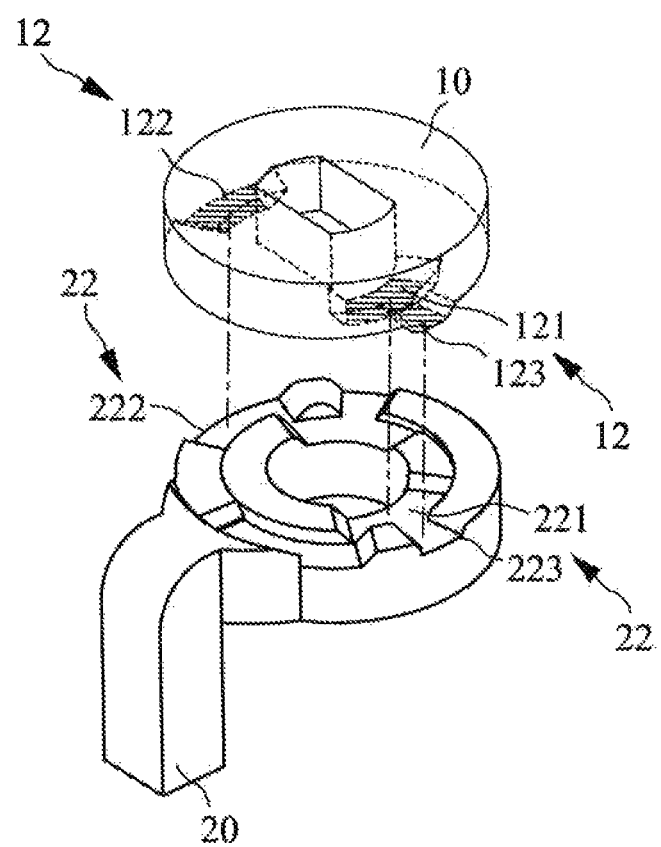
FIG. 8(a) is a structure diagram illustrating the hinge device of another embodiment of the present invention located at 0 degree.
Figure 8B:
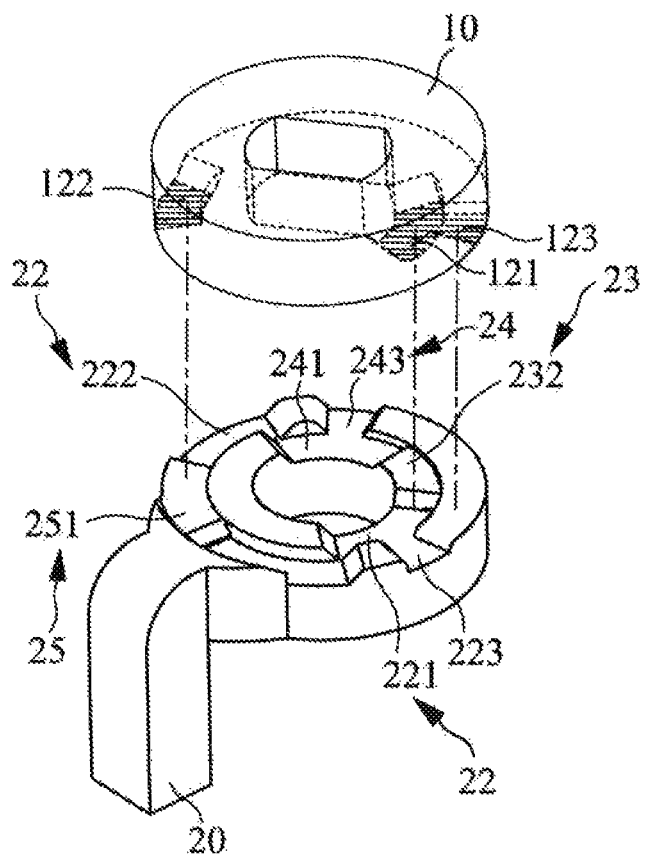
FIG. 8(b) is a structure diagram illustrating the hinge device of another embodiment of the present invention rotated between 0 degree and 120 degree.

Please refer to FIG. 8(a) and FIG. 8(b) together. FIG. 8(a) is a structure diagram illustrating the hinge device of another embodiment of the present invention located at 0 degree; FIG. 8(b) is a structure diagram illustrating the hinge device of another embodiment of the present invention rotated between 0 degree and 120 degree. In order to disclose clearly the operation status between different components of the hinge device 1a of the present invention, the first main body 10a and the second main body 20a are illustrated in the form of separation to each other in FIG. 8(a) and FIG. 8(b), which they are combined to operate originally.

As shown in FIG. 8(a), when the hinge device 1a of the present invention is located at 0 degree, the raised structure 12a of the first main body 10a (as the dotted line structure shown in FIG. 8(a)) is contained relatively in the first position structure 22a of the second main body 20a. Besides that the first raised portion 121 and the second raised portion 122 are contained in the first recessed portion 221 and the second recessed portion 222 respectively, the third raised portion 123 is also contained relatively in the fifth recessed portion 223 to keep a surface contact with each other. The contact surface of the structure is as the area of oblique lines shown in FIG. 8(a).

As shown in FIG. 8(b), when the hinge device 1a of the present invention rotates between 0 degree and 120 degree, the first raised portion 121 of the raised structure 12a of the first main body 10a slides out from the first recessed portion 221 and contact with the first inner control portion 232 of the first torsion control structure 23 of the second main body 20a. Simultaneously, the second raised portion 122 of the raised structure 12a also slides out from the second recessed portion 222 and contacts with the second outer control portion 251 of the second torsion control structure 25, and the third raised portion 123 of the raised structure 12a also slides out from the fifth recessed portion 223 and contacts with the first outer control portion 231 of the first torsion control structure 23 (the height of the third raised portion 123 is lower than the first raised portion 121 and the second raised portion 122, but the height of the relative first outer control portion 231 is higher than the first inner control portion 232 and the second outer control portion 251). The areas of surface contact are changed as the areas of oblique lines shown in FIG. 8(b). So that the first main body 10a forms a displacement along the axis relative to the second main body 20a to increase the magnitude of torque between the first main body 10a and the second main body 20a as aforementioned.

Figure 9A:
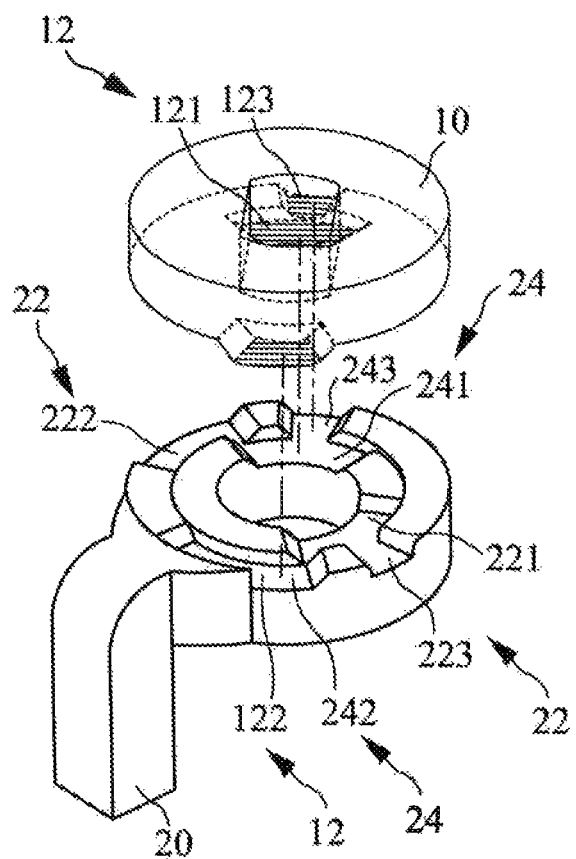
FIG. 9(a) is a structure diagram illustrating the hinge device of another embodiment of the present invention located at 120 degree.
Figure 9B:
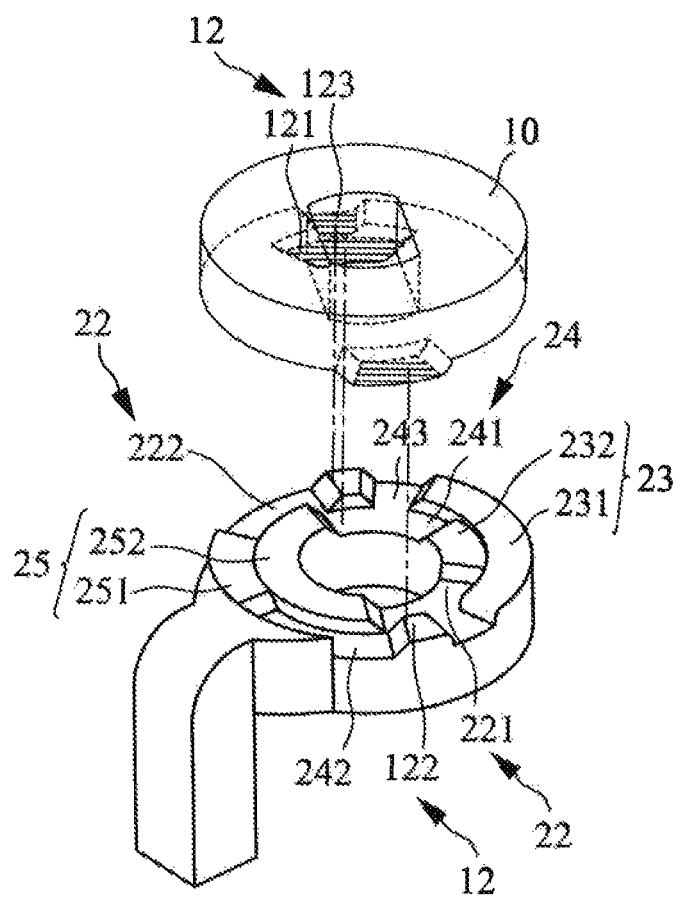
FIG. 9(b) is a structure diagram illustrating the hinge device of another embodiment of the present invention rotated to greater than 120 degree.

Please refer to FIG. 9(a) and FIG. 9(b) together. FIG. 9(a) is a structure diagram illustrating the hinge device 1a of another embodiment of the present invention located at 120 degree; FIG. 9(b) is a structure diagram illustrating the hinge device 1a of another embodiment of the present invention rotated to greater than 120 degree. In order to disclose clearly the operation status between different components of the hinge device 1a of the present invention, the first main body 10a and the second main body 20a are illustrated in the form of separation to each other in FIG. 9(a) and FIG. 9(b), which they are combined to operate originally.

As shown in FIG. 9(a), when the hinge device 1a of the present invention rotates to 120 degree, the raised structure 12a of the first main body 10a is contained relatively in the second position structure 24a of the second main body 20a. The contact surface of the structure at this time is as the area of oblique lines shown in FIG. 9(a).

As shown in FIG. 9(b), when the hinge device 1a of the present invention rotates to greater than 120 degree, the first raised portion 121 of the raised structure 12a of the first main body 10a slides out from the third recessed portion 241 and contacts with the second inner control portion 252 of the second torsion control structure 25 of the second main body 20a. Simultaneously, the second raised portion 122 of the raised structure 12 also slides out from the forth recessed portion 242 and contacts with the first outer control portion 231 of the first torsion control structure 23 (because the first raised portion 121 and the second raised portion 122 have the same height, and the first outer control portion 231 and the second inner control portion 252 have the same height). The areas of surface contact are changed. Because the heights of the first outer control portion 231 and the second inner control portion 252 are higher, such that the third raised portion 123 does not contact with any components of the second main body 20a as the areas of oblique lines shown in FIG. 9(b). The contact status of the first main body 10a and the second main body 20a is the same as the hinge device 1 of the aforementioned embodiment in FIG. 6(b).

Accordingly, the hinge device of the present invention is designed with corresponding structures in accordance with the different aforementioned embodiments. According to the different height difference of the structures of the first main body and the second main body, it can make differences to the contact portions and the contact areas between the first main body and the second main body when the first main body rotates to different angles relative to the second main body. Then it provides different magnitudes of torque in coordination with the elastic component of the hinge device.

Figure 10:
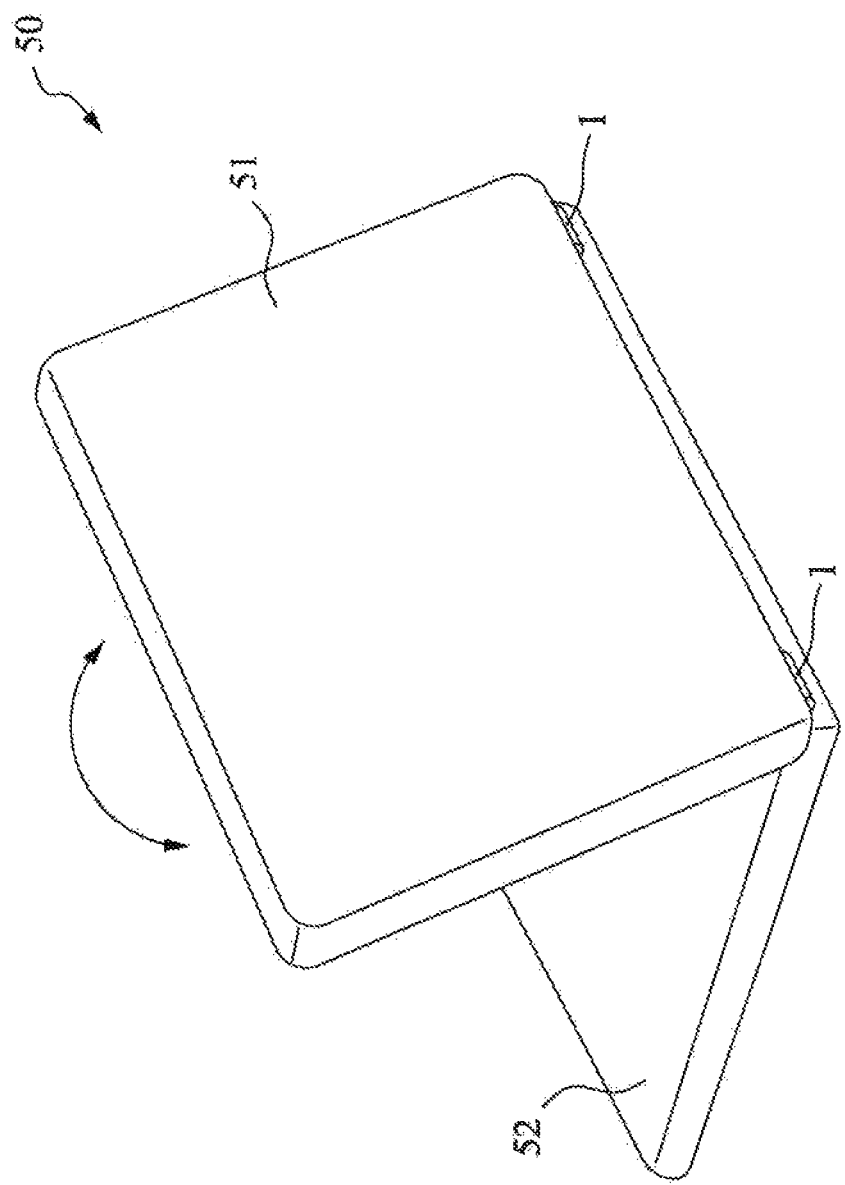
FIG. 10 is a diagram illustrating a opening/closing apparatus of the present invention.

Please refer to FIG. 10, which is a diagram illustrating a opening/closing apparatus 50 of the present invention.

As shown in FIG. 10, the present invention further provides an opening/closing apparatus 50. The opening/closing apparatus 50 includes a first component 51, a second component 52 and at least one hinge device 1 as aforementioned. The first component 51 is connected pivotally to the second component 52 by the at least one hinge device 1, so that the first component 51 can rotate relative to the second component 52 using the at least one hinge device 1 as a pivot. By the structure design of the hinge device 1, the opening/closing apparatus 50 of the present invention forms the positioning effect at any specific rotation angle during the process of the first component 51 rotates relative to the second component 52, and provides different magnitudes of torque during the rotation process to prevent the user to flip the opening/closing apparatus 50 excessively. The opening/closing apparatus 50 can be any apparatus that needs apply hinge function between different components, such as an electronic device with clamshell structure, any box-shape structure or clamshell structures, etc, but the present invention is not limited to this.

As described above, the objectives, means, and effectiveness in the present invention are different from the characteristics in the prior art. It should be noted that the embodiments described above are for illustrating the principles and effects of the present invention, and not for limiting the scope of the present invention. Any person skilled in the art shall be able to make modifications and changes to the embodiments without departing from the technical principle and spirit of the present invention. The claims of the present invention within the scope of protection are described below.

What is claimed is:

1. A hinge device, comprising:
a first main body, including a first shaft hole and a first surface, the first surface surrounding the first shaft hole to form a first inner ring and a first outer ring, and the first surface including a raised structure, wherein the raised structure includes a first raised portion on the first outer ring and a second raised portion on the first inner ring, and the second raised portion is disposed relative to the first raised portion; and
a second main body, including a second shaft hole and a second surface corresponding to the first surface, the second surface surrounding the second shaft hole to form a second inner ring and a second outer ring; the second surface including a first position structure, a first torsion control structure, a second position structure, and a second torsion control structure; wherein the first torsion control structure is adjacent to the first position structure and the second position structure, and the second torsion control structure is adjacent to the first position structure and the second position structure; the second torsion control structure is disposed relative to the first torsion control structure, and the second shaft hole is between the first torsion control structure and the second torsion control structure; wherein the first position structure and the second position structure correspond to the raised structure respectively; the first torsion control structure including a first outer control portion on the second outer ring and a first inner control portion on the second inner ring, the second torsion control structure including a second outer control portion on the second outer ring and a second inner control portion on the second inner ring, wherein a height of the first inner control portion is different from a height of the second inner control portion, and a height of the first outer control portion is different from a height of the second outer control portion.

2. The hinge device as claimed in claim 1, wherein the height of the first inner control portion is less than the height of the second inner control portion, and the height of the first outer control portion is greater than the height of the second outer control portion.

3. The hinge device as claimed in claim 1, wherein the first raised portion and the second raised portion have the same height.

4. The hinge device as claimed in claim 3, wherein the first inner control portion and the second outer control portion have the same height, and the second inner control portion and the first outer control portion have the same height.

5. The hinge device as claimed in claim 1, wherein the first position structure includes a first recessed portion and a second recessed portion, wherein the first recessed portion is disposed on the second outer ring and relative to the first raised portion, and the second recessed portion is disposed on the second inner ring and relative to the second raised portion; the second position structure includes a third recessed portion and a fourth recessed portion, wherein the third recessed portion is disposed on the second outer ring and relative to the first raised portion, and the fourth recessed portion is disposed on the second inner ring and relative to the second raised portion.

6. The hinge device as claimed in claim 5, wherein the raised structure further includes a third raised portion on the first outer ring and the third raised portion is adjacent to the first raised portion; the first position structure further includes a fifth recessed portion on the second outer ring and the fifth recessed portion is adjacent to the first recessed portion; the second position structure further includes a sixth recessed portion on the second outer ring and the sixth recessed portion is adjacent to the third recessed portion.

7. The hinge device as claimed in claim 6, wherein a height of the third raised portion is less than a height of the first raised portion, and a height of the third raised portion is less than a height of the second raised portion.

8. The hinge device as claimed in claim 6, wherein the first raised portion and the third raised portion together form a T-shape structure.

9. The hinge device as claimed in claim 5, wherein the first recessed portion includes a first center, the third recessed portion includes a second center, and the second shaft hole includes a shaft hole center; an included angle formed by connections of the shaft hole center with the first center and the second center respectively is 90 degrees to 120 degrees.

10. The hinge device as claimed in claim 1, wherein a cushion portion is formed at both sides of the first raised portion and the second raised portion respectively, and the cushion portion is an inclined or curved structure.

11. The hinge device as claimed in claim 1, wherein any joint of the first torsion control structure and the first position structure, the first torsion control structure and the second position structure, the second torsion control structure and the first position structure, and the second torsion control structure and the second position structure forms a cushion portion, and the cushion portion is an inclined or curved structure.

12. An opening/closing apparatus, comprising:
a first component;
a second component; and
at least one hinge device, wherein the first component is connected with the second component by the at least one hinge device, the hinge device comprising:
a first main body, including a first shaft hole and a first surface, the first surface surrounding the first shaft hole to form a first inner ring and a first outer ring, and the first surface including a raised structure, wherein the raised structure includes a first raised portion on the first outer ring and a second raised portion on the first inner ring, and the second raised portion is disposed relative to the first raised portion; and
a second main body, including a second shaft hole and a second surface, the second surface surrounding the second shaft hole to form a second inner ring and a second outer ring; the second surface including a first position structure, a first torsion control structure, a second position structure, and a second torsion control structure; wherein the first torsion control structure is adjacent to the first position structure and the second position structure, the second torsion control structure is disposed relative to the first torsion control structure based on the second shaft hole, and the second torsion control structure is adjacent to the first position structure and the second position structure, wherein the first position structure and the second position structure correspond to the raised structure respectively; the first torsion control structure including a first outer control portion on the second outer ring and a first inner control portion on the second inner ring, the second torsion control structure includes a second outer control portion on the second outer ring and a second inner control portion on the second inner ring, wherein a height of the first inner control portion is different from a height of the second inner control portion, and a height of the first outer control portion is different from a height of the second outer control portion.

13. The opening/closing apparatus as claimed in claim 12, wherein the height of the first inner control portion is less than the height of the second inner control portion, and the height of the first outer control portion is greater than the height of the second outer control portion.

14. The opening/closing apparatus as claimed in claim 12, wherein the first raised portion and the second raised portion have the same height, the first inner control portion and the second outer control portion have the same height, and the second inner control portion and the first outer control portion have the same height.

15. The opening/closing apparatus as claimed in claim 12, wherein the first position structure includes a first recessed portion and a second recessed portion, wherein the first recessed portion is disposed on the second outer ring and relative to the first raised portion, and the second recessed portion is disposed on the second inner ring and relative to the second raised portion; the second position structure includes a third recessed portion and a fourth recessed portion, wherein the third recessed portion is disposed on the second outer ring and relative to the first raised portion, and the fourth recessed portion is disposed on the second inner ring and relative to the second raised portion.

16. The opening/closing apparatus as claimed in claim 15, wherein the first recessed portion includes a first center, the third recessed portion includes a second center, and the second shaft hole includes a shaft hole center, an included angle formed by connections of the shaft hole center with the first center and the second center respectively is 90 degrees to 120 degrees.

17. The opening/closing apparatus as claimed in claim 12, wherein the raised structure further includes a third raised portion on the first outer ring and the third raised portion is adjacent to the first raised portion, the first position structure further includes a fifth recessed portion on the second outer ring and the fifth recessed portion is adjacent to the first recessed portion, and the second position structure further includes a sixth recessed portion on the second outer ring and the sixth recessed portion is adjacent to the third recessed portion.

18. The opening/closing apparatus as claimed in claim 17, wherein a height of the third raised portion is less than a height of the first raised portion, and a height of the third raised portion is less than a height of the second raised portion.

19. The opening/closing apparatus as claimed in claim 17, wherein the first raised portion and the third raised portion together form a T-shape structure.

20. The opening/closing apparatus as claimed in claim 12, wherein a cushion portion is formed at both sides of the first raised portion and the second raised portion respectively, and the cushion portion is an inclined or curved structure; wherein any joint of the first torsion control structure and the first position structure, the first torsion control structure and the second position structure, the second torsion control structure and the first position structure, and the second torsion control structure and the second position structure forms a cushion portion, and the cushion portion is an inclined or curved structure.

* * * * *